United States Patent
Lynn et al.

(10) Patent No.: US 7,260,113 B2
(45) Date of Patent: Aug. 21, 2007

(54) METHOD AND APPARATUS FOR BALANCING A REQUEST LOAD OF COMMUNICATION CHANNELS

(75) Inventors: James A. Lynn, Rose Hill, KS (US); Pramodh K. Mereddy, Wichita, KS (US)

(73) Assignee: LSI Corporation, Milpitas, CA (US)

(*) Notice: Subject to any disclaimer, the term of this patent is extended or adjusted under 35 U.S.C. 154(b) by 1041 days.

(21) Appl. No.: 10/230,824

(22) Filed: Aug. 29, 2002

(65) Prior Publication Data
US 2004/0213288 A1    Oct. 28, 2004

(51) Int. Cl.
*H04J 3/16* (2006.01)
(52) U.S. Cl. .................... 370/468; 370/230.1
(58) Field of Classification Search ............ None
See application file for complete search history.

(56) References Cited

U.S. PATENT DOCUMENTS 5,546,549 A * 8/1996 Barrett et al. ............... 710/305
5,749,044 A * 5/1998 Natarajan et al. .......... 455/13.1

\* cited by examiner

*Primary Examiner*—Chi Pham
*Assistant Examiner*—Phuc Tran
(74) *Attorney, Agent, or Firm*—Duft, Bornsen, & Fishman

(57) ABSTRACT

The present invention provides systems and methods for balancing a request load on device communication channels. A system includes a channel scanner, a processor, and a load balancer. The system may iteratively balance the request load on the communication channels. The device communication channels are typically connected between controllers and a system of devices. The channel scanner is configured for scanning the channels to determine the number or bandwidth of requests of each device. The processor may rank the devices by the number or bandwidth of requests of each device. The load balancer may allocate the requests between the channels based on the rank of the devices. For example, the load balancer may receive the rank order of the devices from the processor and allocate the requests based on the rank order. The load balancer may additionally allocate the requests based on present capabilities of the channels.

20 Claims, 3 Drawing Sheets

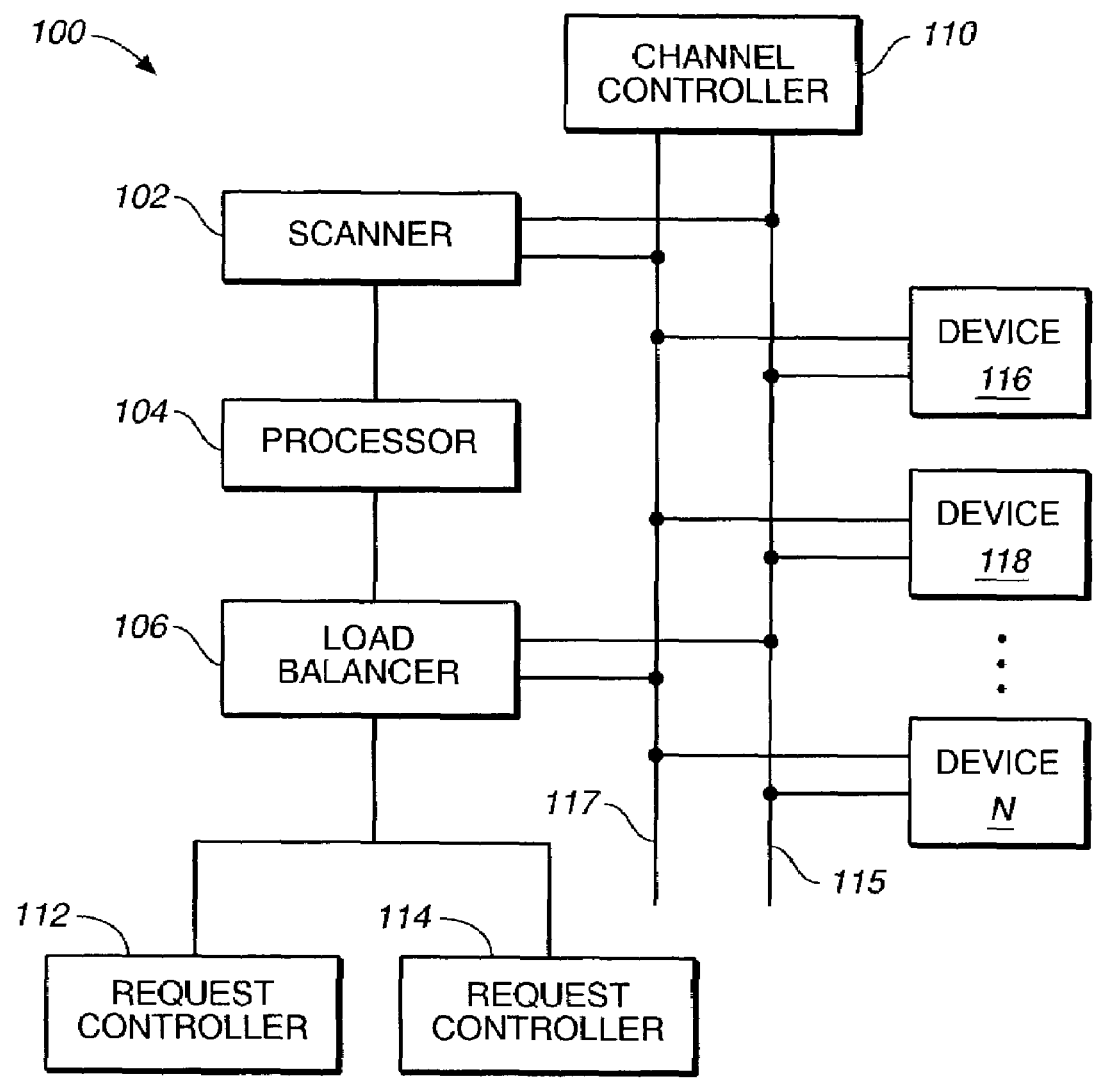
FIG._1

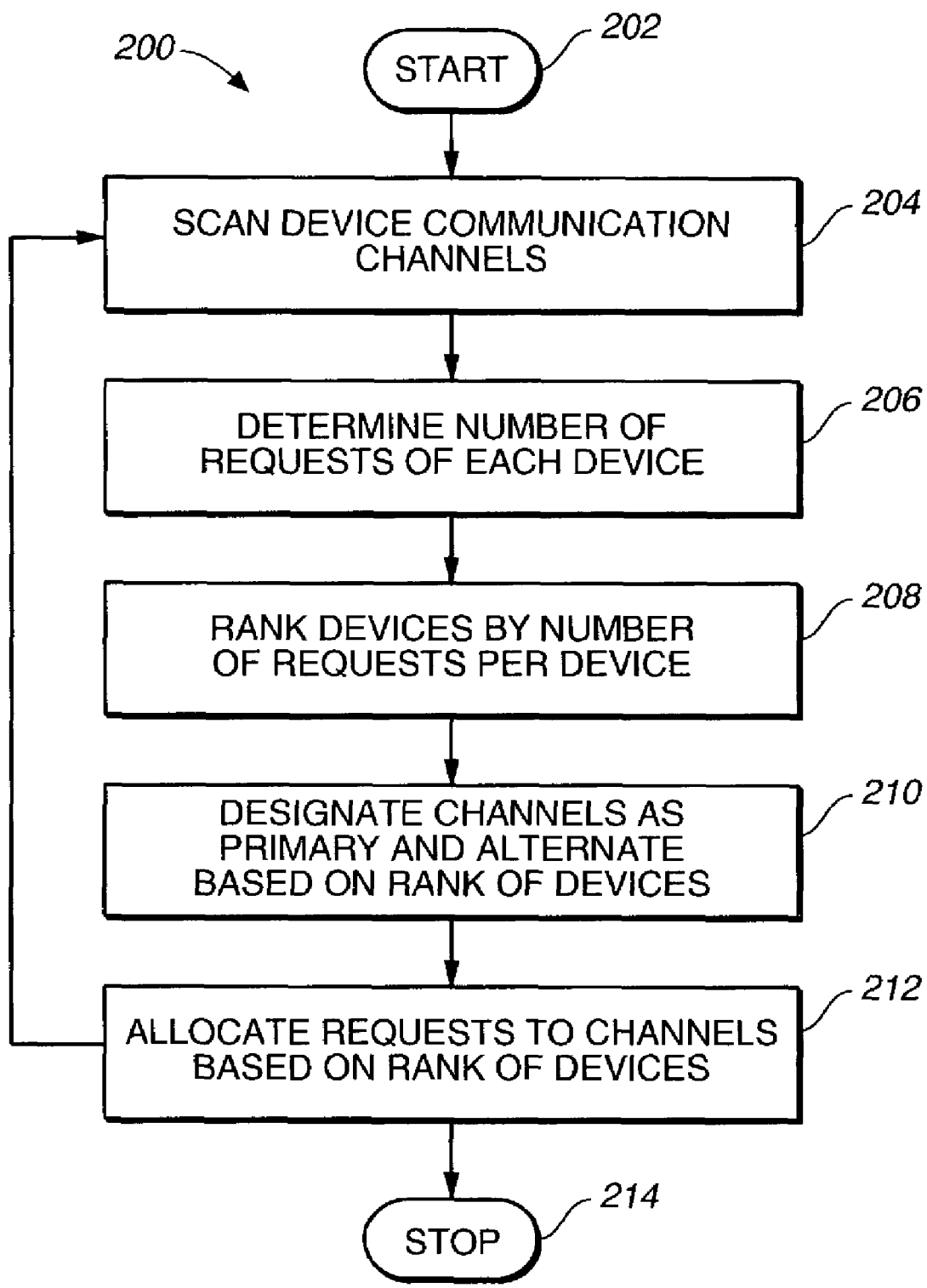
FIG._2

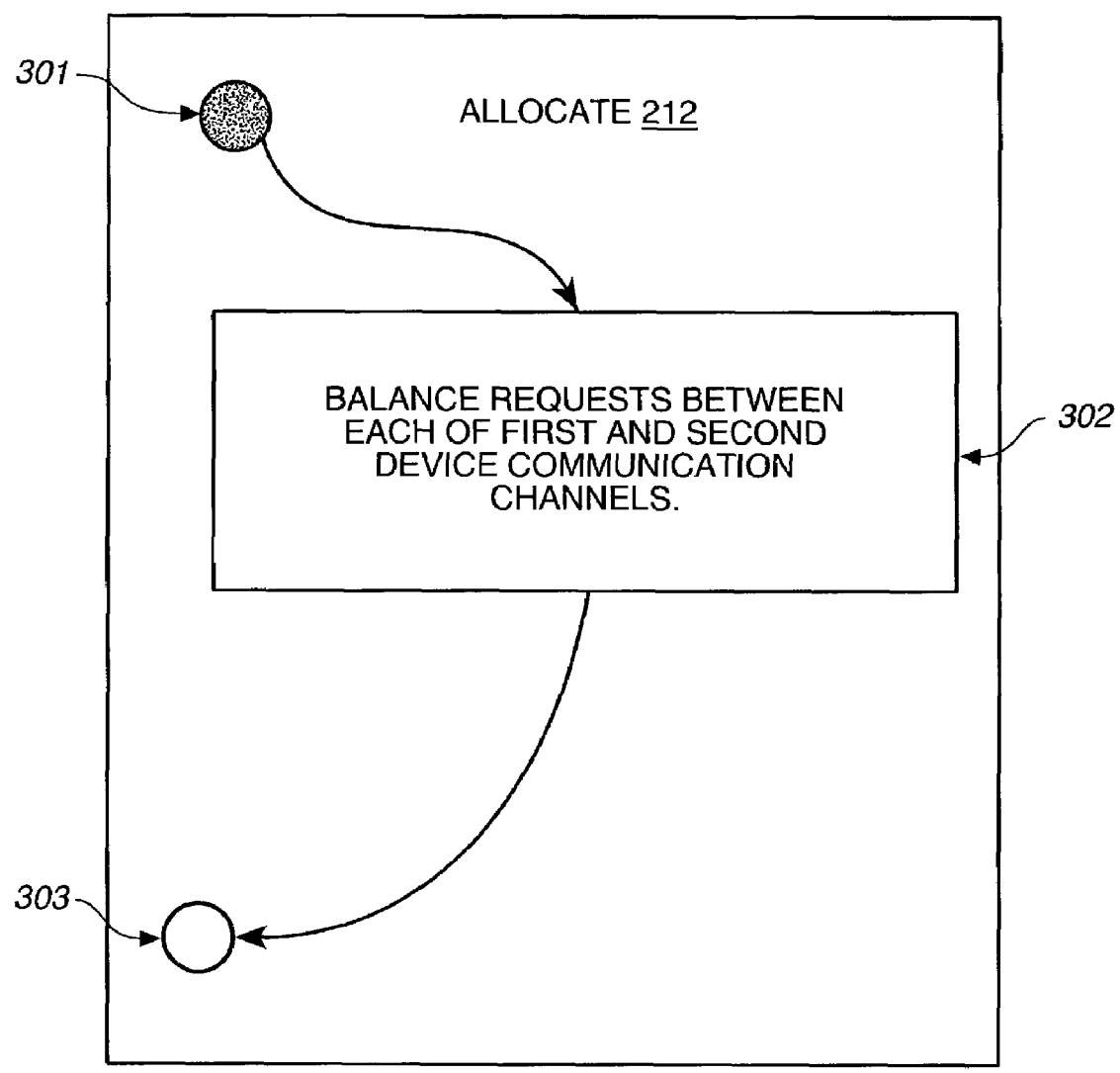
FIG._3

METHOD AND APPARATUS FOR BALANCING A REQUEST LOAD OF COMMUNICATION CHANNELS

BACKGROUND OF THE INVENTION

1. Field of the Invention

The present invention is generally directed toward balancing a request load on communication channels. More specifically, the present invention relates to balancing a request load placed on redundant communication channels to a plurality of storage devices.

2. Discussion of Related Art

Load balancing is a method of distributing a load among a number of resources. In the data storage arts, load balancing occurs in storage systems having multiple storage controllers to process requests received from attached host systems and to manipulate data stored on storage devices, such as computer disk drives. Load balancing is especially important for storage systems where it's difficult to predict the number of requests or the size of the requests that will be issued. In such storage systems, multiple requests may be received by the storage system and processed by one of the storage controllers of the storage system. Some storage controllers of the storage system may receive more requests than others. Unbalanced requests among the storage controllers can burden a storage system and diminish overall, aggregate storage processing capabilities of the storage system. To improve the storage processing capabilities of the storage system, the storage system balances request loads from the host systems to the controllers by evenly distributing the requests to each controller of the storage system.

Load balancing of the storage system improves processing speeds of the requests and alleviates request "bottlenecks". However, modern storage systems may also employ redundant communication channels for exchange of information between the storage controller(s) and the storage devices. The redundant communication channels are necessary in the event that one of the channels becomes disabled. As one channel becomes disabled, the other channel can be used to provide communications for the system. When not required to replace a disabled channel the other channel is often left essentially unused—merely in a "ready" state to be substituted for a disabled channel. However, the redundant channels may also be used to supplement available communications bandwidth for the system. For example, a storage system having multiple channels connected to multiple disks can process more requests than a storage system having a single channel. Rather than leave a redundant channel essentially idle, its additional bandwidth capability may be used to supplement the available bandwidth of the other channel(s).

Use of the redundant channels to supplement communications can create request load imbalances on the channels. Presently, systems, such as storage systems, have redundant channels for reliability purposes and utilize the additional available bandwidth for supplemental communications with the storage devices. Low level I/O operations to be directed to particular disk drives are randomly or arbitrarily assigned to one of the redundant channels. However, arbitrary assignments of requests to the channels eventually create either the same or slightly improved performance of a single channel. For example, as the channels are used in parallel to transfer more arbitrary requests, bottlenecks form in the channels because of random selection of the requests directed to each channel. Such performance bottlenecks severely impair request processing of the system, as the system must wait for particular requests to clear through the channels. Many systems cannot afford the luxury of having impaired request processing.

As evident from the above discussion, a need exists for improved structures and methods for allocating requests through communication channels so as to provide more reliable request processing.

SUMMARY OF THE INVENTION

The present invention solves the above and other problems and advances the state of the useful arts by providing an apparatus and a method for balancing a request load on device communication channels. More specifically, the present invention provides for balancing a request load on redundant communication channels that are connected to a system of devices. Other types of request load balancing are described in U.S. Pat. No. 6,173,374 issued to Heil et al. and U.S. Pat. No. 6,108,684 issued to DeKoning et al., commonly owned by LSI logic Corporation and incorporated by reference herein.

In one exemplary preferred embodiment of the invention, a system balances a request load on the device communication channels. The system may iteratively balance the request load. The system includes a channel scanner, a processor, and a load balancer. The channel scanner is configured for scanning the channels to determine the number and/or bandwidth of requests of each of the devices. Two or more channels couple a controller to each of the devices. The controller receives and process requests received from attached host systems and processes the requests by accessing the devices via the channels. The controller determines the best channel to use for processing of the request in accordance with the present load distributed to each channel in accordance with the information derived by the channel scanner.

In one exemplary preferred embodiment of the invention, the controllers are storage system controllers configured for processing input/output (I/O) requests to computer disk drives (e.g. devices), or other storage devices. However, the controllers may process other types of requests and/or communications, such as control requests.

In one exemplary preferred embodiment of the invention, a processor is communicatively connected to the channel scanner for ranking the devices by the number and/or bandwidth of requests of each device. For example, as the channel scanner scans the channels and determines the number of requests of each of the devices, the processor may rank each of the devices by a number of received requests. To illustrate, two controllers may process I/O requests over the channels to multiple storage devices. Since each storage device may have a number of I/O requests, each storage device may be ranked in order by the number of their respectively received I/O requests.

In one exemplary preferred embodiment of the invention, a load balancer is communicatively connected to the processor for allocating the requests between the channels based on the rank of the devices. For example, the load balancer may receive the rank order of the devices from the processor and accordingly allocate the requests from the controllers over the channels. The load balancer may allocate the requests to the channels by evenly distributing the requests over the channels. The load balancer may determine the distribution for the requests over the channels based on a present capability of the channels. For example, if one particular channel is operating in a reduced or degraded manner, the load balancer may determine the number of requests the channel is capable of transferring and allocate the requests accordingly. Additionally, since the system may iteratively balance the request load, load balancing of requests becomes a dynamic process. Allocating the requests based on the rank of the devices may balance the request load on the channels.

In one aspect of the invention, a method is provided for balancing a request load on device communication channels connected to a system of devices. The method includes steps determining a number and/or bandwidth of requests of each device, ranking the devices by the number and/or bandwidth of the requests of each device, and allocating the requests to the channels based on the rank of the devices to balance the request load.

In another aspect of the invention, the method includes a step of scanning the channels to determine the number and/or bandwidth of requests of each device.

In another aspect of the invention, the method includes a step of iteratively balancing the request load.

In another aspect of the invention, the step of allocating includes a step of balancing the requests between each of a first and a second device communication channels.

In another aspect of the invention, the method includes steps of designating the first device communication channel as a primary channel for a first request controller of one or more of the devices and designating the second device communication channel as an alternate channel for the first request controller when the first device communication channel is designated as the primary channel of the first request controller. The method also includes steps of designating the second device communication channel as a primary channel for a second request controller the devices and designating the first device communication channel as an alternate channel for the second request controller when the second device communication channel is designated as the primary channel of the second request controller.

In another aspect of the invention, the method includes steps of designating the second device communication channel as a primary channel for a first request controller of one or more of the devices and designating the first device communication channel as an alternate channel for the first request controller when the second device communication channel is designated as the primary channel of the first request controller. The method also includes steps of designating the first device communication channel as a primary channel for a second request controller of the devices and designating the second device communication channel as an alternate channel for the second request controller when the first device communication channel is designated as the primary channel of the second request controller.

Advantages of the invention include an improved performance in processing requests to the devices over the channels. Other advantages include allowing a user substantially unrestricted options in device usage since request loads placed on the channels are balanced by the system.

BRIEF DESCRIPTION OF THE PREFERRED EMBODIMENTS

FIG. 1 is a block diagram illustrating an exemplary preferred embodiment of the invention.

FIG. 2 is a flow chart diagram illustrating an exemplary preferred operation of the invention.

FIG. 3 is a flow chart diagram illustrating an exemplary preferred step of the operation of the invention.

DETAILED DESCRIPTION OF THE PREFERRED EMBODIMENTS

While the invention is susceptible to various modifications and alternative forms, a specific embodiment thereof has been shown by way of example in the drawings and will herein be described in detail. Those skilled in the art will appreciate that the features described below can be combined in various ways to form multiple variations of the invention. As a result, the invention is not limited to the specific examples described below, but only by the claims and their equivalents.

With reference now to the figures and in particular with reference to FIG. 1, an exemplary preferred embodiment of the invention is shown in system 100. System 100 is configured to balance a request load on device communication channels 115 and 117. System 100 may iteratively balance the request load on channels 115 and 117. System 100 includes channel scanner 102, processor 104, load balancer 106, channel controller 110, request controllers 112 and 114, and devices 116, 118 . . . N. In system 100, communication channels 115 and 117 are connected to devices 116, 118 . . . N. System 100 may include a plurality of channels, such as channels 115 and 117, and is not intended to be limited to the number of channels in the exemplary embodiment. Additionally, system 100 may include a plurality of channel controllers, such as channel controller 110, and request controllers, such as request controllers 112 and 114, and is not intended to be limited to the number of controllers in the exemplary embodiment.

In system 100, channel scanner 102 is configured for scanning channels 115 and 117 to determine the number and/or bandwidth of requests of each of devices 116, 118 . . . N. Since system 100 may iteratively balance the request load, channel scanner 102 may iteratively scan the channels to determine the number and/or bandwidth of requests of each of devices 116, 118 . . . N, thereby dynamically determining the number and/or bandwidth of requests through channels 115 and 117. Channel scanner 102 may iteratively scan the channels at periodic intervals and/or at intervals as determined by a user.

In system 100, processor 104 is communicatively connected to channel scanner 102 for ranking the devices by the number and/or bandwidth of requests of each device. For example, as channel scanner 102 scans channels 115 and 117 and determines the number and/or bandwidth of requests of devices 116, 118 . . . N, processor 104 may rank each of devices 116, 118 . . . N by the number and/or bandwidth of received requests. In system 100, load balancer 106 is communicatively connected to processor 104 for allocating the requests between channels 115 and 117 based on the rank of devices 116, 118 . . . N. For example, load balancer 106 may receive the rank order of devices 116, 118 . . . N from processor 104 and accordingly allocate the requests over channels 115 and 117.

Load balancer 106 may evenly distribute the requests over channels 115 and 117. Load balancer 106 may evenly distribute the requests over more channels as system 100 may include more channels. Load balancer 106 may determine the distribution for the requests over channels 115 and 117 based on a present capability of channels 115 and 117.

For example, if channel 115 is operating in a reduced or degraded manner, load balancer 106 may determine the number and/or bandwidth of requests channel 115 is capable of transferring and allocate the requests to channels 115 and 117 accordingly.

In system 100, request controllers 112 and 114 process the requests to devices 116, 118 . . . N. In some embodiments, devices 116, 118 . . . N include storage devices, such as computer disk drives. Request controllers 112 and 114 may, thus, process I/O requests and transfer the I/O request over channels 115 and 117 to the storage devices. However, request controllers 112 and 114 may process other types of requests and/or communications, such as control requests, to other types of devices, such as communication devices. System 100 may, therefore, be used for balancing any communications on channels 115 and 117 between other devices and/or other controllers.

Each of devices 116, 118 . . . N may have varying numbers and/or bandwidths of requests. As an example, channel scanner 102 may scan channels 115 and 117 to determine the number and/or bandwidth of requests processed by controllers 112 and 114 to devices 116, 118 . . . N. Once the number and/or bandwidth of requests to devices 116, 118 . . . N is determined, processor 104 may rank the devices 116, 118 . . . N based on the number and/or bandwidth of requests. For example, if device 116 receives more requests than device 118, device 116 may be ranked higher than device 118, thereby indicating that device 116 is occupying more request transfer capability of channels 115 and 117. Once processor 104 ranks devices 116, 118 . . . N, load balancer 106 may balance the number and/or bandwidth of requests on channels 115 and 117 to devices 116, 118 . . . N. Allocation of the requests based on the rank of devices 116, 118 . . . N may balance the request load on channels 115 and 117.

In system 100, channel controller 110 is communicatively connected to channels 115 and 117 for designating channel 115 as a primary channel for request controller 112. Channel controller 110 may designate channel 117 as an alternate channel for controller 112 when channel 115 is designated as the primary channel of controller 112. Channel controller 110 may designate channel 117 as a primary channel for controller 114 and channel 115 as an alternate channel for controller 114 when the channel 117 is designated as the primary channel of controller 114. Channel controller 110 may additionally be configured for designating channel 117 as a primary channel for controller 112 and designating channel 115 as an alternate channel for controller 112 when channel 117 is designated as the primary channel of controller 112. Channel controller 110 may also designate channel 115 as a primary channel for controller 114 and designate channel 117 as an alternate channel for controller 114 when channel 115 is designated as the primary channel of controller 114. Designation of channels 115 and 117 as primary and/or alternate channels with respect to controllers 112 and 114 may assist in implementing the dynamic load balancing as discussed herein. Once channels 115 and 117 are designated as primary and/or alternate channels, load balancing of devices 116, 118 . . . N, can be ranked and mapped, thereby allowing load balancer 106 to distribute the request load over channels 115 and 117. An example of the mapping is shown below in Table 1:

TABLE 1

| REQUEST CONTROLLER 112 | | REQUEST CONTROLLER 114 | | MAP |
|---|---|---|---|---|
| Primary | Alternate | Alternate | Primary | Device$_1$ |
| Alternate | Primary | Primary | Alternate | Device$_2$ |
| . . . | . . . | . . . | . . . | . . . |
| Primary | Alternate | Alternate | Primary | Device$_n$ |

As an example, suppose device 116 receives 1000 requests via request controller 112, device 118 receives 2000 requests via request controller 112, and device N receives 3000 requests via request controller 112. In the example, device 116 may be ranked and mapped by load balancer 106 as device$_n$, device 118 may be ranked and mapped by load balancer 106 as device$_2$, and device N may be ranked and mapped by load balancer 106 as device$_1$. The requests over channels 115 and 117 would, thus, be distributed as channel 115 receiving 4000 requests (e.g. the requests of devices 116 and N) and channel 117 receiving 2000 requests (e.g. the requests of device 118). Those skilled in the art should understand that other manners of mapping might be used to distribute the requests between channels 115 and 117.

FIG. 2 illustrates exemplary preferred operation 200 of system 100 of FIG. 1. Operation 200 commences, in step 202. Channel scanner 102 scans channels 115 and 117, in step 204. Channel scanner 102 determines the number and/or bandwidth of requests to devices 116, 118 . . . N over channels 115 and 117 processed by request controllers 112 and 114, in step 206. The requests may include I/O requests made to a plurality of storage devices, such as devices 116, 118 . . . N. However, other types of communication and/or requests may be made over channels 115 and 117. Processor 104 ranks devices 116, 118 . . . N based on the number and/or bandwidth of received requests, in step 208. Channel controller 110 designates channels 115 and 117 as primary and alternate with respect to request controllers 112 and 114, in step 210. Designation of channels 115 and 117 may be performed in accordance with Table 1 shown in FIG. 1. Additionally, the designation may be performed at other periods of operation 200. Once devices 116, 118 . . . N are ranked and channels 115 and 117 are designated, load balancer 106 may allocate the requests to channels 115 and 117 based on the rank of devices 116, 118 . . . N, in step 212. Operation 200 ends in step 214.

FIG. 3 illustrates an exemplary preferred embodiment of allocate step 212 of the operation of FIG. 2. Allocate step 212 enters through entry point 301. Load balancer 106 balances the requests between channels 115 and 117 to distribute the requests in a substantially even manner, in step 302. Allocate step 212 exits through exit point 303.

Those skilled in the art will understand that other methods can be used to transfer requests over channels that fall within the scope of the invention.

Instructions that perform the operations of FIGS. 2 and 3 can be stored on storage media. The instructions can be retrieved and executed by a microprocessor. Some examples of instructions are software, program code, and firmware. Some examples of storage media are memory devices, tapes, disks, integrated circuits, and servers. The instructions are operational when executed by the microprocessor to direct the microprocessor to operate in accord with the invention. Those skilled in the art are familiar with instructions and storage media.

Advantages of the invention include an improved performance in processing requests to the devices over the channels. Other advantages include allowing a user substantially unrestricted options in device usage since request loads placed on the channels are balanced by the system.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of balancing a request load on a plurality of device communication channels connected to a system of devices, the method including the steps of:
    determining a volume of utilization of the device communication channels by each device;
    ranking the devices by the volume of utilization of the device communication channels by each device; and
    allocating one of the plurality of device communication channels as a primary channel and at least one of the other plurality of device communication channels as an alternate channel for each device based on the rank of the devices to balance the request load.

2. The method of claim 1, further including a step of scanning the channels to determine the volume of utilization of the device communication channels by each device.

3. The method of claim 2, further including a step of iteratively balancing the request load.

4. The method of claim 1, wherein the step of allocating includes a step of
    allocating the primary channel to each device in an alternating order of the plurality of device communication channels based on the rank of each device.

5. The method of claim 1, wherein the plurality of device communication channels include a first and a second device communication channel, and the method further includes the steps of:
    designating the first device communication channel as a primary channel for a first request controller of one or more of the devices based on the ranking;
    designating the second device communication channel as an alternate channel for the first request controller when the first device communication channel is designated as the primary channel of the first request controller;
    designating the second device communication channel as a primary channel for a second request controller of one or more of the devices based on the ranking; and
    designating the first device communication channel as an alternate channel for the second request controller when the second device communication channel is designated as the primary channel of the second request controller.

6. The method of claim 1, wherein the plurality of device communication channels include a first and a second device communication channel, and the method further includes the steps of:
    designating the second device communication channel as a primary channel for a first request controller of one or more of the devices based on the ranking;
    designating the first device communication channel as an alternate channel for the first request controller when the second device communication channel is designated as the primary channel of the first request controller;
    designating the first device communication channel as a primary channel for a second request controller of one or more of the devices based on the ranking; and
    designating the second device communication channel as an alternate channel for the second request controller when the first device communication channel is designated as the primary channel of the second request controller.

7. A system for balancing a request load on a plurality of device communication channels connected to a system of devices, the system including:
    a channel scanner configured for scanning the channels to determine a volume of utilization of the device communication channels by each device;
    a processor communicatively connected to the channel scanner for ranking the devices by the volume of utilization of the device communication channels by each device; and
    a load balancer communicatively connected to the processor for allocating one of the plurality of device communication channels as a primary channel and at least one of the other plurality of device communication channels as an alternate channel for each device based on the rank of the devices to balance the request load.

8. The system of claim 7, further including first and second request controllers communicatively connected to the load balancer for processing the requests of the devices.

9. The system of claim 8, further including a channel controller communicatively connected to the channels for designating a first device communication channel as a primary channel for a first request controller of one or more of the devices based on the ranking, designating a second device communication channel as an alternate channel for the first request controller when the first device communication channel is designated as the primary channel of the first request controller, designating the second device communication channel as a primary channel for a second request controller of the devices based on the ranking, and designating the first device communication channel as an alternate channel for the second request controller when the second device communication channel is designated as the primary channel of the second request controller.

10. The system of claim 8, further including a channel controller communicatively connected to the channels for designating a second device communication channel as a primary channel for a first request controller of one or more of the devices based on the ranking, designating the first device communication channel as an alternate channel for the first request controller when the second device communication channel is designated as the primary channel of the first request controller, designating the first device communication channel as a primary channel for a second request controller of the devices based on the ranking, and designating the second device communication channel as an alternate channel for the second request controller when the first device communication channel is designated as the primary channel of the second request controller.

11. The system of claim 7, wherein the devices include at least one disk drive.

12. A system for balancing a request load on a plurality of device communication channels connected to a system of devices, the system including:
    means for determining a volume of utilization of the device communication channels by each device;
    means for ranking the devices by the volume of utilization of the device communication channels by each device; and
    means for allocating one of the plurality of device communication channels as a primary channel and at least one of the other plurality of device communication channels as an alternate channel for each device based on the rank of the devices to balance the request load.

13. The system of claim 12, further including means for scanning the channels to determine the volume of utilization of the device communication channels by each device.

14. The system of claim 13, further including means for iteratively balancing the request load.

15. The system of claim 12, wherein the means for allocating includes means for
    allocating the primary channel to each device in an alternating order of the plurality of device communication channels based on the rank of each device.

16. The system of claim 12, wherein the plurality of device communication channels include a first and a second device communication channel, and the system further includes:
    means for designating the first device communication channel as a primary channel for a first request controller of one or more of the devices based on the ranking;
    means for designating the second device communication channel as an alternate channel for the first request controller when the first device communication channel is designated as the primary channel of the first request controller;
    means for designating the second device communication channel as a primary channel for a second request controller of one or more of the devices based on the ranking; and
    means for designating the first device communication channel as an alternate channel for the second request controller when the second device communication channel is designated as the primary channel of the second request controller.

17. The system of claim 12, wherein the plurality of device communication channels include a first and a second device communication channel, and the system further includes:
    means for designating the second device communication channel as a primary channel for a first request controller of one or more of the devices based on the ranking;
    means for designating the first device communication channel as an alternate channel for the first request controller when the second device communication channel is designated as the primary channel of the first request controller;
    means for designating the first device communication channel as a primary channel for a second request controller of one or more of the devices based on the ranking; and
    means for designating the second device communication channel as an alternate channel for the second request controller when the first device communication channel is designated as the primary channel of the second request controller.

18. The method of claim 1 wherein the system of devices comprises a system of disk drives.

19. The system of claim 12 wherein the system of devices comprises a system of disk drives.

20. The method of claim 1 wherein the step of ranking further comprises ranking the devices in a descending order based on the volume of utilization of each device.

* * * * *